M. H. STANDLEY.
SPRING FOR AUTO TIRES.
APPLICATION FILED NOV. 23, 1917. RENEWED MAR. 4, 1920.

1,336,868.

Patented Apr. 13, 1920.

INVENTOR
Melvin. H. Standley,

WITNESSES

BY

ATTORNEY

UNITED STATES PATENT OFFICE.

MELVIN H. STANDLEY, OF SCOTT CITY, KANSAS, ASSIGNOR OF ONE-HALF TO WESELEY WARD, OF SCOTT CITY, KANSAS.

SPRING FOR AUTO-TIRES.

1,336,868.         Specification of Letters Patent.         Patented Apr. 13, 1920.

Application filed November 23, 1917, Serial No. 203,574. Renewed March 4, 1920. Serial No. 363,281.

*To all whom it may concern:*

Be it known that I, MELVIN H. STANDLEY, a citizen of the United States, residing at Scott City, in the county of Scott and State of Kansas, have invented certain new and useful Improvements in Springs for Auto-Tires, of which the following is a specification.

This invention relates to resilient tires, and it relates more particularly to a wire spring element of a resilient tire.

One of the objects of this invention is to provide a device of this character which may supplant or supplement compressed air for yieldingly holding a tire casing extended.

Another object of the invention is to provide a device of this character which comprises a series of complemental loops which are so united and arranged that their exterior surfaces combine to present the appearance of a helical coil, so as to support the interior cylindrical surface of a tire casing.

Another object of the invention is to provide a device of this character which may be entirely formed from a single strand of wire, so that the element may be primarily formed into a series of loops containing any number of the loops, which series may be curtailed to any desired extent, according to the circumferential dimension of the tire to be equipped therewith.

Another object is to provide a device of this character in the form of an attachment which may be applied to and removed from a tire casing at will.

Another object is to provide a device of this character which is so simple of construction that it may be manufactured at a comparatively low cost, and that it may be applied to the tire casing by any person of ordinary ability.

Figure 1:
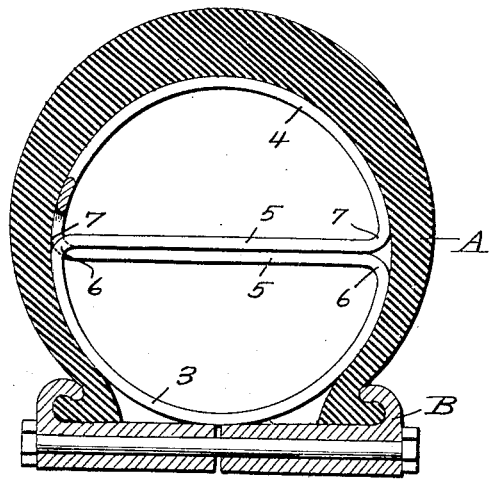
Figure 2:
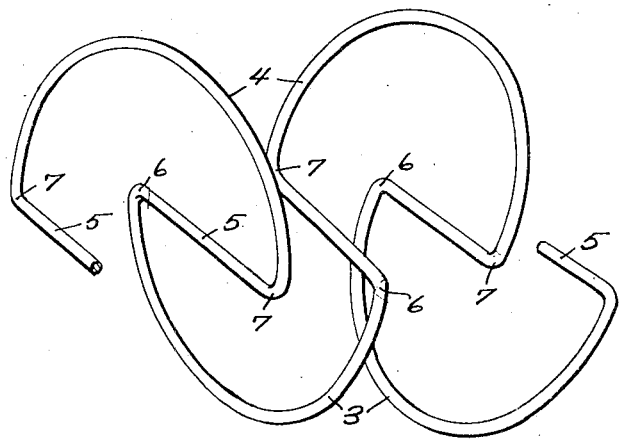

Other objects and advantages may become apparent to persons who read the following details of description in connection with the accompanying drawings in which:

Figure 1 is a transverse sectional view through a tire casing and rim of ordinary construction, and through one of the loops of the attachment which constitutes my invention and Fig. 2 is a somewhat diagrammatic view illustrating several convolutions or loops of the device separated sufficiently to clearly show their construction and relation to one another.

Referring to these drawings, in which similar reference characters correspond with similar parts throughout the several views the tire casing A and rim B, being of ordinary construction, are not described in detail. The spring wire device which constitutes my invention is formed into two series of substantially semi-circular convolutions, the inner one of the two series being designated by the numeral 3, and the outer one being designated by the numeral 4. The inner and outer convolutions are connected by chordal elements 5, being united therewith at 6 and 7. Viewed in another light, there is one of the chordal elements 5 for each of the lower or inner arcuate or semi-circular elements 3, and one of the chordal elements 5 for each of the upper or outer arcuate or semi-circular elements 4, so that the device comprises a plurality of counterpart upper and lower loops or convolutions, each consisting of a semi-circular element, a chordal element and parts 6 and 7.

The chordal elements 5 are straight and disposed diametrically of the casing substantially parallel with one another and substantially parallel with the axis around which the tire rotates, and these chordal elements constitute the principal spring elements of the device, while the end portions of the elements 3 and 4 coöperate therewith and with the parts 6 and 7 for providing the desired resiliency. The elements 5 are so arranged that they move with relation to one another in the radial direction of the tire, and in the direction transversely of their length, so that they pass one another when the tread of the tire is pressed inward toward the center thereof; and because of their resiliency, they each pass one another when the pressure is relieved on the tread of the tire.

Although I have shown this device in connection with a form of clencher tire, it is obvious that my invention may be applied to other forms of tires, such, for instance as "single tube" tires or casings. Moreover, although I have disclosed a device of this character which is applicable to tires having a circular interior surface, it is not beyond the scope of this invention to provide a device of this character which is applicable to tires or casings which are non-circular in transverse section.

From the foregoing, it will be seen that I have provided a very simple, comparatively inexpensive, thoroughly practical and efficient device of this character which should meet with great favor among manufacturers, dealers and users of resilient tires.

What I claim as my invention is:

1. A tire filler, consisting of spring wire bent into substantially helical form and having the convolutions divided into relatively outer and inner semi-circular elements and connected at opposite ends by straight chordal elements.

2. A tire filler, consisting of spring wire bent into substantially helical form and having the convolutions divided into relatively outer and inner semi-circular elements and intermediate connecting chordal elements which are straight and disposed diametrically in substantially parallel relation, corresponding ends of adjacent inner semi-circular elements being connected to the opposite ends of companion outer adjacent semi-circular elements by the chordal elements.

In testimony whereof I affix my signature in presence of two witnesses.

MELVIN H. STANDLEY.

Witnesses:
V. JAGGAR,
H. JAGGAR.